March 27, 1928.
B. H. SINGLETARY
1,663,999
TOOL FOR BALLING AND REMOVING OF PLANTS
Filed Aug. 26, 1927     2 Sheets-Sheet 2
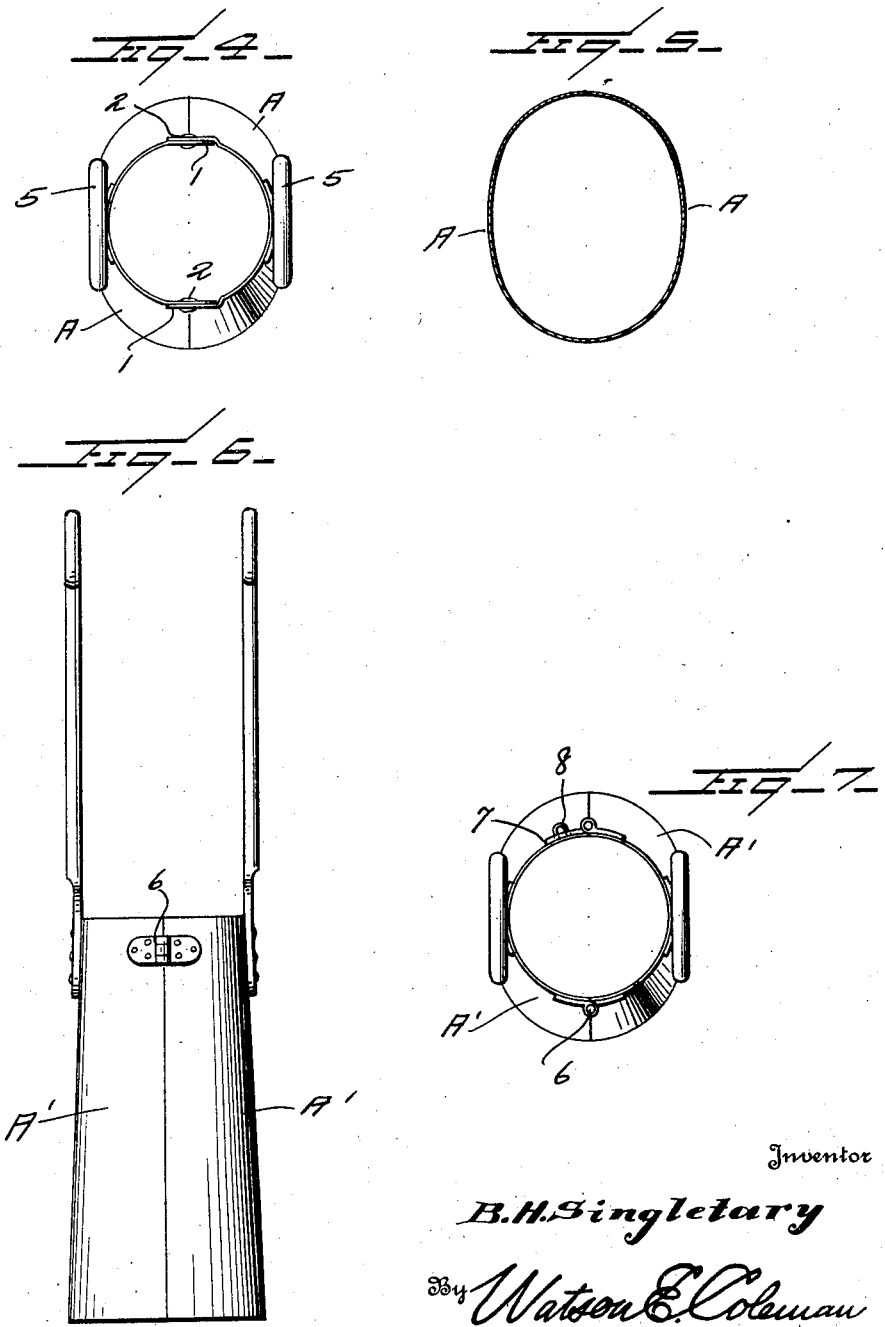

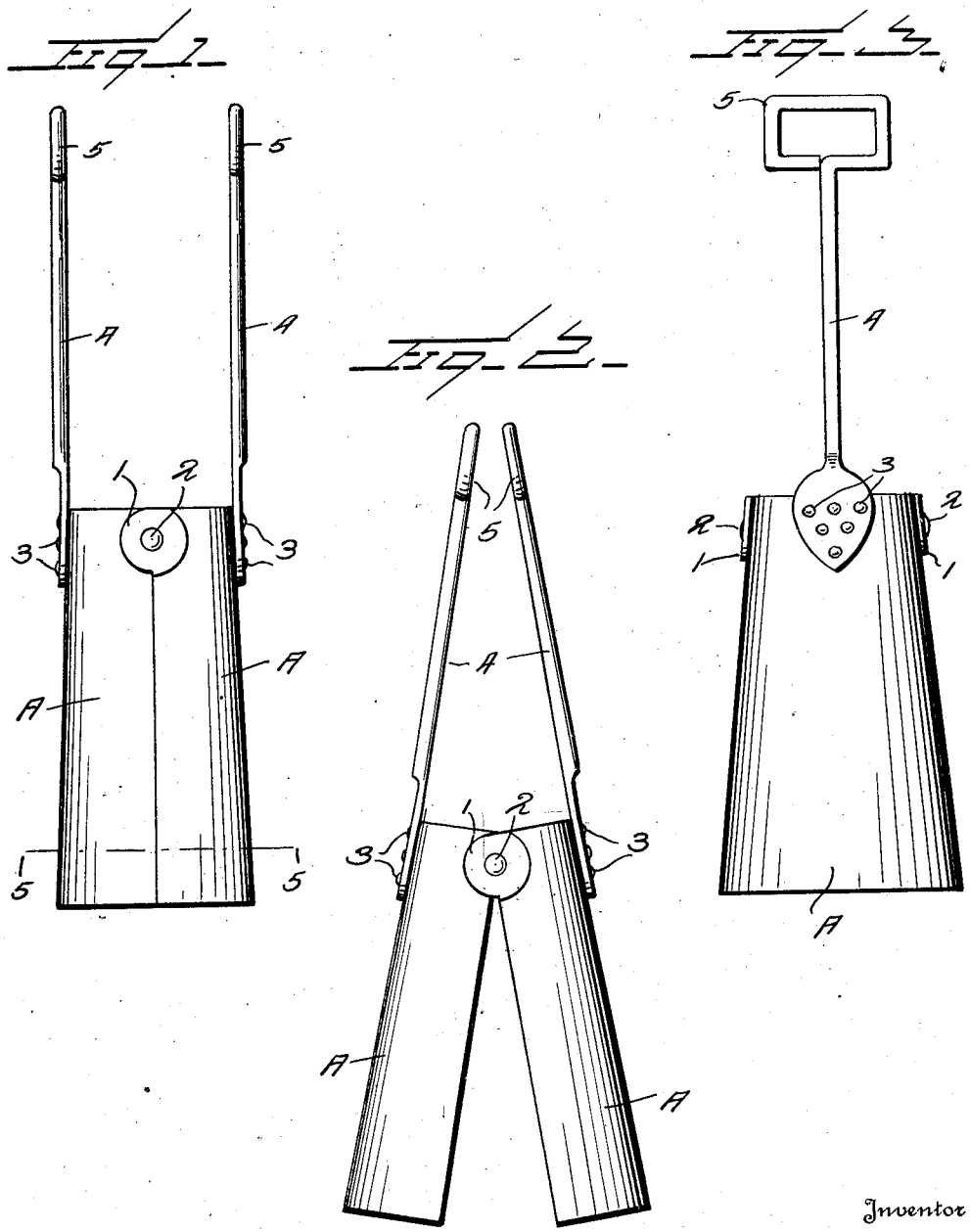

Patented Mar. 27, 1928.

1,663,999

UNITED STATES PATENT OFFICE.

BENJAMIN HENRY SINGLETARY, OF BATON ROUGE, LOUISIANA.

TOOL FOR BALLING AND REMOVING OF PLANTS.

Application filed August 26, 1927. Serial No. 215,698.

This invention relates to a transplanting implement and it is an object of the invention to provide a device of this kind which operates to effect a removal of a plant without disturbing the roots thereof.

It is also an object of the invention to provide a device of this kind operating in a manner whereby the soil removed with the plant is packed in substantially the form of a cylinder and wherein the soil is so compressed about the plant that the same will not fall away when released from the implement.

An additional object of the invention is to provide a device of this kind comprising two relatively movable blades or members which, when in closed relation, are substantially cylindrical in form with the upper end of a less diameter than the lower end and wherein the upper end of the substantially closed blades is circular and the lower end elliptical.

A still further object of the invention is to provide an implement of this kind which constitutes a plant baller and remover which operates to remove a plant with the soil intact and leaving a clean hole as deep as the implement may be pushed into the soil.

The invention has for an object to provide an implement of this kind especially designed and adapted for use in removing plants from seed beds, nursery, or under field conditions without material injury to plants, and more especially from cold-frames, hotbeds and greenhouses.

The invention consists in the details of construction and in the combination and arrangement of the several parts of my improved transplanting implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is an elevational view of a transplanting device constructed in accordance with an embodiment of my invention with the blades in closed relation;

Figure 2 is a view similar to Figure 1 with the blades in open relation;

Figure 3 is a view in elevation of the device as disclosed in the preceding figures at a quarter turn;

Figure 4 is a view in top plan of the structure as illustrated in Figure 1;

Figure 5 is a sectional view taken substantially on the line 5—5 of Figure 1;

Figure 6 is a view in elevation illustrating a slightly modified form of invention;

Figure 7 is a view in top plan of the structure illustrated in Figure 6.

As is particularly illustrated in Figures 1 to 5, my improved transplanting implement, or plant baller and remover as it also may be called, comprises two blades A of substantially duplicate construction each having its upper end portion semi-circular in form and its lower end semi-elliptical with the diameter at the top being less than the mean diameter of the lower end.

The upper or smaller ends of the blades are provided at their longitudinal margins with the overlapping ears or lugs 1 through which are disposed rivets 2 or kindred pintle members whereby the blades A have relative swinging movement, said blades being so constructed that when fully closed the opposed longitudinal edges of the blades below the ears or lugs 1 are adapted to have close contact.

The upper or pivoted end portions of the blades A midway thereof have riveted, as at 3, or otherwise affixed thereto the upstanding handle members 4 provided at their upper or free extremities with the hand grasps 5. By swinging the handle members 4 one toward the other the blades A will be swung outwardly into separated relation whereas opposite movement of said handle members will effect a reverse movement of the blades.

In view of the design or structure of the blades as hereinbefore referred to, when said blades are in closed relation a cylindrical implement is provided circular at its top but elliptical at its bottom.

In practice, with the blades A in their closed relation the resultant cylinder is placed around the plant to be removed and the blades pushed into the soil. As the blades are lifted out they bring along all soil as well as the plant leaving a clean hole as deep as the implement was pushed into the soil. When it is desired to deposit the plant and soil where desired, the handle members 4 are brought together resulting in a ready release of the plant and soil. This operation is facilitated by the particular formation of the blades A and which is of especial import as the roots of the plants removed by the implement are undisturbed. My improved implement can be worked rapidly and efficiently and is of especial advantage in the removal of plants from seed beds, nursery or under field conditions without injury to plants and also can be employed with particular advantage in removing plants from cold-frames, hotbeds and greenhouses. The efficiency of the implement is such as to justify the elimination of using paper cups and pots in growing plants, thus cutting out the cost of the pots and labor for filling the same with soil. Plants removed with my improved implement may be readily placed on planting boards and carried to place of planting as if taken from pots or cups.

When using the devce for removing nursery stock the plants can be dropped from the implement onto the baling material and then tied as when done when digging plants with a spade.

For use in connection with plants of a size whereby the closed blades cannot be readily placed over such plants, I find it of advantage to employ the embodiment of my invention illustrated in Figures 6 and 7. In this embodiment of my invention the blades A' are constructed substantially in the same manner as hereinbefore set forth with respect to the blades A except that adjacent longitudinal marginal portions of the blades A' at a point preferably in close proximity to the smaller or upper ends thereof are hingedly connected, as at 6, for relative lateral swinging movement. The opposite longitudinal marginal portions at said smaller or upper ends are provided with the coacting hasp 7 and staple 8 or other preferred locking means whereby the blades A' may be effectively held in their desired closed relation yet readily disconnected for the relative outward swinging movement when it is desired to release the plant and soil held within the closed blades.

It is believed to be obvious that either form of my improved implement as herein disclosed will readily ball and remove plants without material injury at any time of the year, only giving the lateral roots the necessary pruning from hotbeds, cold-frames, greenhouses, etc.

From the foregoing description it is thought to be obvious that a transplanting implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An implement of the class described for balling and removing plants comprising two substantially duplicate blades, means for connecting said blades for movement one with respect to the other, said blades when in closed position providing a substantially cylindrical body, one end portion of said body when the blades are in their substantially closed position being circular and the opposite end being elliptical.

2. An implement of the class described for balling and removing plants comprising two substantially duplicate blades, means for connecting said blades for movement one with respect to the other, said blades when in closed position providing a substantially cylindrical body, one end portion of said body when the blades are in their substantially closed position being circular and the opposite end being elliptical, the circular end being of less diameter than the mean diameter of the elliptical end.

3. An implement of the class described for balling and removing plants comprising two substantially duplicate blades, means for connecting said blades for movement one with respect to the other, said blades when in closed position providing a substantially cylindrical body, one end portion of said body when the blades are in their substantially closed position being circular and the opposite end being elliptical, the circular end being at the top, and operating members secured to the blades at the top portions thereof.

B. H. SINGLETARY.